United States Patent
Okada et al.

(10) Patent No.: US 9,738,273 B2
(45) Date of Patent: Aug. 22, 2017

(54) VEHICLE CONTROL APPARATUS

(75) Inventors: Yuruki Okada, Tokyo (JP); Hisanori Yamasaki, Tokyo (JP); Keita Hatanaka, Tokyo (JP); Yasuhiko Wada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 318 days.

(21) Appl. No.: 14/370,895

(22) PCT Filed: Jan. 31, 2012

(86) PCT No.: PCT/JP2012/052162
§ 371 (c)(1),
(2), (4) Date: Jul. 7, 2014

(87) PCT Pub. No.: WO2013/114571
PCT Pub. Date: Aug. 8, 2013

(65) Prior Publication Data
US 2015/0006009 A1 Jan. 1, 2015

(51) Int. Cl.
*B62D 5/04* (2006.01)
*B60W 20/50* (2016.01)
(Continued)

(52) U.S. Cl.
CPC ............. *B60W 20/50* (2013.01); *B60K 6/46* (2013.01); *B60W 10/06* (2013.01); *B60W 10/08* (2013.01);
(Continued)

(58) Field of Classification Search
CPC ........... B60W 10/08; B60W 2710/086; B60W 2710/083; Y02T 10/6217; Y02T 10/6286
See application file for complete search history.

(56) References Cited

U.S. PATENT DOCUMENTS

| 2008/0006236 A1* | 1/2008 | Yamashita | F02D 41/021 123/198 R |
| 2010/0196189 A1 | 8/2010 | Nakagawa et al. | |
| 2013/0133790 A1 | 5/2013 | Ariga et al. | |

FOREIGN PATENT DOCUMENTS

EP 1 052 401 B1 9/2003
EP 2 053 279 A2 4/2009
(Continued)

OTHER PUBLICATIONS

An English translation of the Office Action (Notification of Reason(s) for Refusal) issued on Feb. 5, 2013, by the Japanese Patent Office in corresponding Japanese Patent Application No. 2013-554129. (4 pages).

(Continued)

*Primary Examiner* — Jelani Smith
*Assistant Examiner* — Jordan S Fei
(74) *Attorney, Agent, or Firm* — Buchanan Ingersoll & Rooney PC (57) ABSTRACT

In a host controller included in a vehicle control apparatus, a generator-torque-command generating unit monitors an abnormal operation of the engine on the basis of an engine power generation command and a detection signal of a rotating speed detector, switches, when the abnormal operation of the engine is detected, a generator torque command to the lowest value of a torque command value for abnormal time set in advance as the generator torque command, thereafter, gradually increases the generator torque command, and, after recording, as a torque limit value, the magnitude of the generator torque command (a torque command value for abnormal time 3) at the time when the abnormal operation of the engine is detected again, switches the generator torque command to a torque command value (Continued)

for abnormal time (a torque command value for abnormal time 2) having a value smaller than the torque limit value.

1 Claim, 7 Drawing Sheets (51) Int. Cl.
B60K 6/46 (2007.10)
B60W 10/08 (2006.01)
B60W 10/06 (2006.01)
B60W 50/02 (2012.01)
B60W 50/038 (2012.01)

(52) U.S. Cl.
CPC .... *B60W 50/0205* (2013.01); *B60W 50/0225* (2013.01); *B60W 50/038* (2013.01); *B60W 2710/083* (2013.01); *B60W 2710/086* (2013.01); *Y02T 10/6217* (2013.01); *Y02T 10/6286* (2013.01)

(56) References Cited

FOREIGN PATENT DOCUMENTS

| JP | 58-136719 A | 8/1983 |
| JP | 2003-221648 A | 8/2003 |
| JP | 2003-268509 A | 9/2003 |
| JP | 2004-143518 A | 5/2004 |
| JP | 2004208368 A * | 7/2004 |
| JP | 2006-213957 A | 8/2006 |
| JP | 3890459 B2 | 12/2006 |
| JP | 3890459 B2 | 3/2007 |
| JP | 2008-014221 A | 1/2008 |
| JP | 2008013119 A * | 1/2008 |
| JP | 2008-054408 A | 3/2008 |
| JP | 2009-052139 A | 3/2009 |
| JP | 2009-073410 A | 4/2009 |
| JP | 2011-174468 A | 9/2011 |
| JP | 2011-225980 A | 11/2011 |
| WO | 2008/004418 A1 | 1/2008 |

OTHER PUBLICATIONS

International Search Report (PCT/ISA/210) mailed on Apr. 24, 2012, by the Japanese Patent Office as the International Searching Authority for International Application No. PCT/JP2012/052162.
Written Opinion (PCT/ISA/237) mailed on Apr. 24, 2012, by the Japanese Patent Office as the International Searching Authority for International Application No. PCT/JP2012/052162.
The extended European Search Report issued on Sep. 13, 2016, by the European Patent Office in corresponding European Patent Application No. 12867340.7-1752. (8 pages).

* cited by examiner

VEHICLE CONTROL APPARATUS

FIELD

The present invention relates to a vehicle control apparatus that controls, for example, a hybrid vehicle.

BACKGROUND

There has been disclosed a technology for, in a hybrid vehicle capable of traveling by the power output from an electric motor, for the purpose of more properly determining whether or not a detection element used for detection of an air-fuel ratio of an internal combustion engine is submerged and securing traveling while protecting the detection element even when the detection element is submerged, determining an abnormality due to submerging of an air-fuel ratio sensor on the basis of element impedance of the air-fuel ratio sensor, controlling an engine and a motor such that requested power Pe* is output from the engine and requested torque Tr* is output to a driving shaft when there is no abnormality, and controlling the engine and the motor such that submerged-time limited power Pew obtained by limiting the requested power is output from the engine and the requested torque Tr* is output to the driving shaft when an abnormality is detected (e.g., Patent Literature 1).

CITATION LIST

Patent Literature

Patent Literature 1: Japanese Patent No. 3890459

SUMMARY

Technical Problem

However, the conventional method is an idea to, if there is an abnormality in the air-fuel ratio sensor, change requested power at normal time to more limited single submerged-time limited power. Therefore, there is a problem in that fine power control and torque control for the engine cannot be performed. The power control and the torque control at normal time are complicated. The degree of an abnormality varies depending on various states of control. Therefore, it is desired to perform protective operation cooperation in which a plurality of protection levels are set rather than a single protection level.

The present invention has been devised in view of the above and it is an object of the present invention to provide a vehicle control apparatus that can perform protective operation cooperation in which a plurality of protection levels are set.

Solution to Problem

In order to solve the aforementioned problems, a vehicle control apparatus applied to a vehicle driving system that includes an engine, an engine controller that controls operation of the engine, a generator coupled to the engine, a converter that converts alternating-current power output by the generator into desired direct-current power, a load apparatus receives supply of the direct-current power from the converter and operate, and a rotating-speed detector that detects rotating speed of the generator, according to one aspect of the present invention is configured to be capable of controlling operations of the engine controller and the converter, wherein a host controller that collectively controls the engine controller and the converter is provided, the host controller includes: an engine-power-generation-command generating unit that generate an engine power generation command for causing the engine to operate and driving the generator, and outputs the engine power generation command to the engine controller; and a generator-torque-command generating unit that receives notch information in a plurality of stages included in the engine power generation command, select torque corresponding to magnitude of a notch, and output the selected torque to the converter as a generator torque command, wherein the generator-torque-command generating unit monitors an abnormal operation of the engine on the basis of the engine power generation command and a detection signal of the rotating speed detector, switches, when the abnormal operation of the engine is detected, the generator torque command to the lowest value of a torque command value for abnormal time set in advance as the generator torque command, thereafter, gradually increases the generator torque command, and, after recording, as a torque limit value, magnitude of the generator torque command at the time when the abnormal operation of the engine is detected again, switches the generator torque command to a torque command value for abnormal time having a value smaller than the torque limit value.

Advantageous Effects of Invention

According to the present invention, there is an effect that it is possible to perform protective operation cooperation in which a plurality of protection levels are set.

DESCRIPTION OF EMBODIMENTS

Vehicle control apparatuses according to embodiments of the present invention are explained below with reference to the accompanying drawings. Note that the present invention is not limited by the embodiments explained below.

First Embodiment

Figure 1:
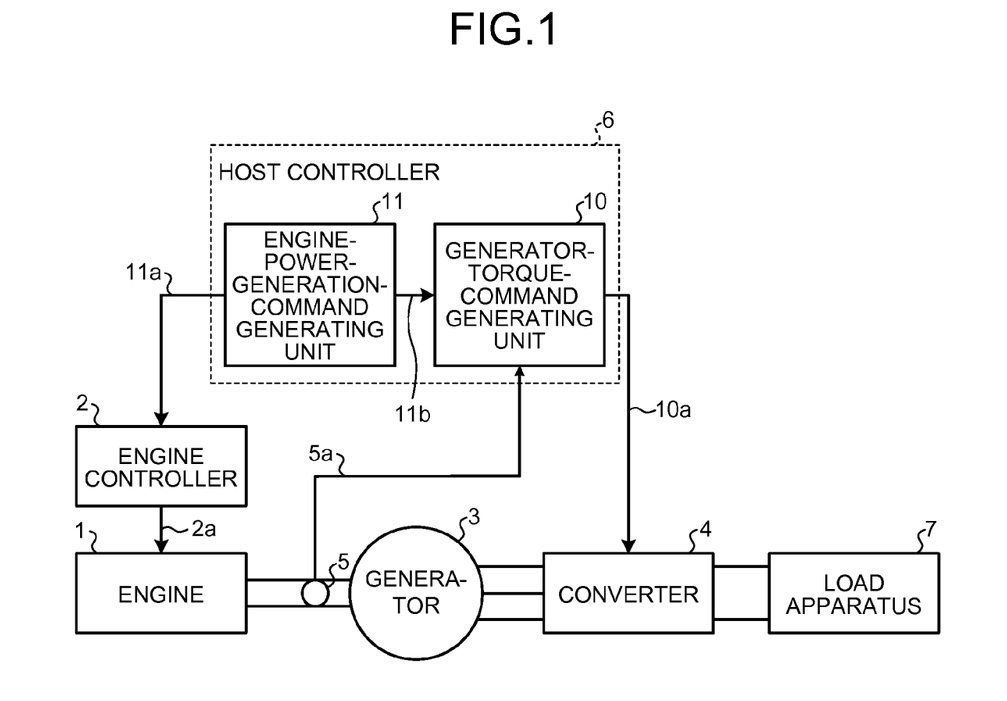
FIG. 1 is a diagram of a configuration example of a vehicle driving system including a vehicle control apparatus according to a first embodiment.

FIG. 1 is a diagram of a configuration example of a vehicle driving system including a vehicle control apparatus according to a first embodiment of the present invention. The configuration of the vehicle driving system applied to an engine system of a series hybrid system is shown. As shown in FIG. 1, the vehicle driving system according to the first embodiment includes an engine 1, an engine controller 2, a generator 3, a converter 4, a speed sensor 5 functioning as a rotating speed detector, a host controller 6, and a load apparatus 7. The vehicle control apparatus according to the first embodiment includes, among these components, the generator 3, the converter 4, and the host controller 6. Note that the vehicle control apparatus can include the engine 1, the engine controller 2, the speed sensor 5, and a part of the load apparatus 7.

The engine 1 functions as an internal combustion engine, consumes fuel, and outputs a rotating force according to a fuel injection amount command 2a given by the engine controller 2. A rotating shaft of the engine 1 is directly connected to a rotating shaft of the generator 3. The rotating force of the engine 1 is directly transmitted to the generator 3. On the other hand, the generator 3 is generally a three-phase alternating-current generator. An output terminal of a stator three-phase winding wire is connected to the converter 4. The generator 3 converts the output of a mechanical rotating force from the engine 1 into three-phase alternating-current power and supplies the three-phase alternating-current power to the converter 4. The converter 4 converts the three-phase alternating-current power supplied from the generator 3 into direct-current power and supplies the direct-current power to the load apparatus 7. Note that, although components of the load apparatus 7 are not shown in the figure, the load apparatus 7 includes, for example, an inverter device that converts the direct-current power into alternating-current power, a battery that stores the direct-current power, an electric motor that drives a vehicle, and a reduction gear that decelerates an output of the electric motor and transmits the output to an axle.

The operation of the vehicle control apparatus including the function of the host controller 6 is explained. The host controller 6 includes, as shown in FIG. 1, a generator-torque-command generating unit 10 and an engine-power-generation-command generating unit 11. The host controller 6 has a function of collectively performing cooperative control on the overall operation of the engine 1, the engine controller 2, the generator 3, and the converter 4.

Figure 3:
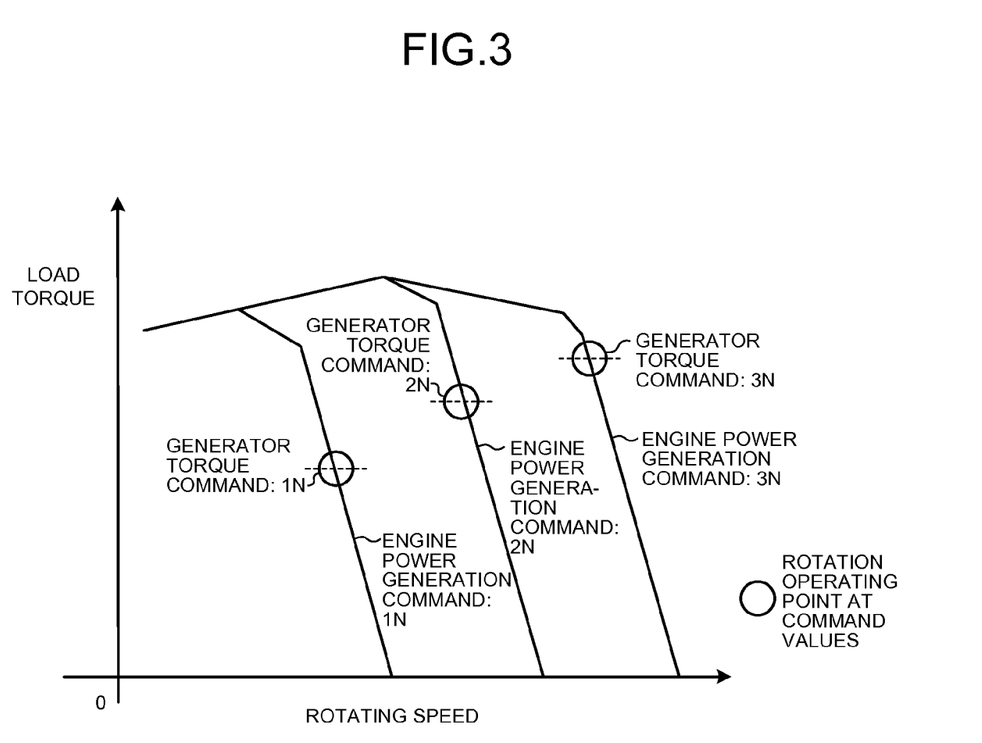
FIG. 3 is a diagram of an example of an engine driving control characteristic of an engine controller.

The engine-power-generation-command generating unit 11 outputs, to the engine controller 2, an engine power generation command 11a for causing the engine 1 to operate and driving the generator 3. The engine controller 2 adjusts the fuel injection amount command 2a according to the level of the engine power generation command 11a. The engine 1 is driven. An example of a driving control characteristic of the engine 1 of the engine controller 2 is shown in FIG. 3. In FIG. 3, the abscissa represents rotating speed of an engine rotating shaft and the ordinate represents load torque that can be output. The engine power generation command is set to have a plurality of stages. When a larger engine power generation output is requested, the engine 1 is controlled to perform higher-speed rotation. In an example shown in FIG. 3, the engine power generation command is set in three stages (three notches: 1N, 2N, and 3N).

In all the notches (1N, 2N, and 3N), when load torque applied to the rotating shaft is 0, the engine 1 is rotated at maximum speed set by the characteristic of each of the notches. When the load torque increases, fuel injection is increased and output torque is increased according to the speed-torque characteristic set for each of the notches. The engine 1 is driven with output torque equal to the load torque. Mechanical output [W] is a product of the speed and the output torque. Therefore, as the speed is higher or the output torque is larger, a larger mechanical output [W] is obtained. As a result, large electric power is obtained via the generator 3 and the converter 4. Therefore, when explained with reference to the example shown in FIG. 3, when larger generated power is requested, the engine-power-generation-command generating unit 11 outputs engine power generation command 3N to the engine controller 2. When smaller generated power is requested, the engine-power-generation-command generating unit 11 outputs the engine power generation command 1N.

Figure 2:
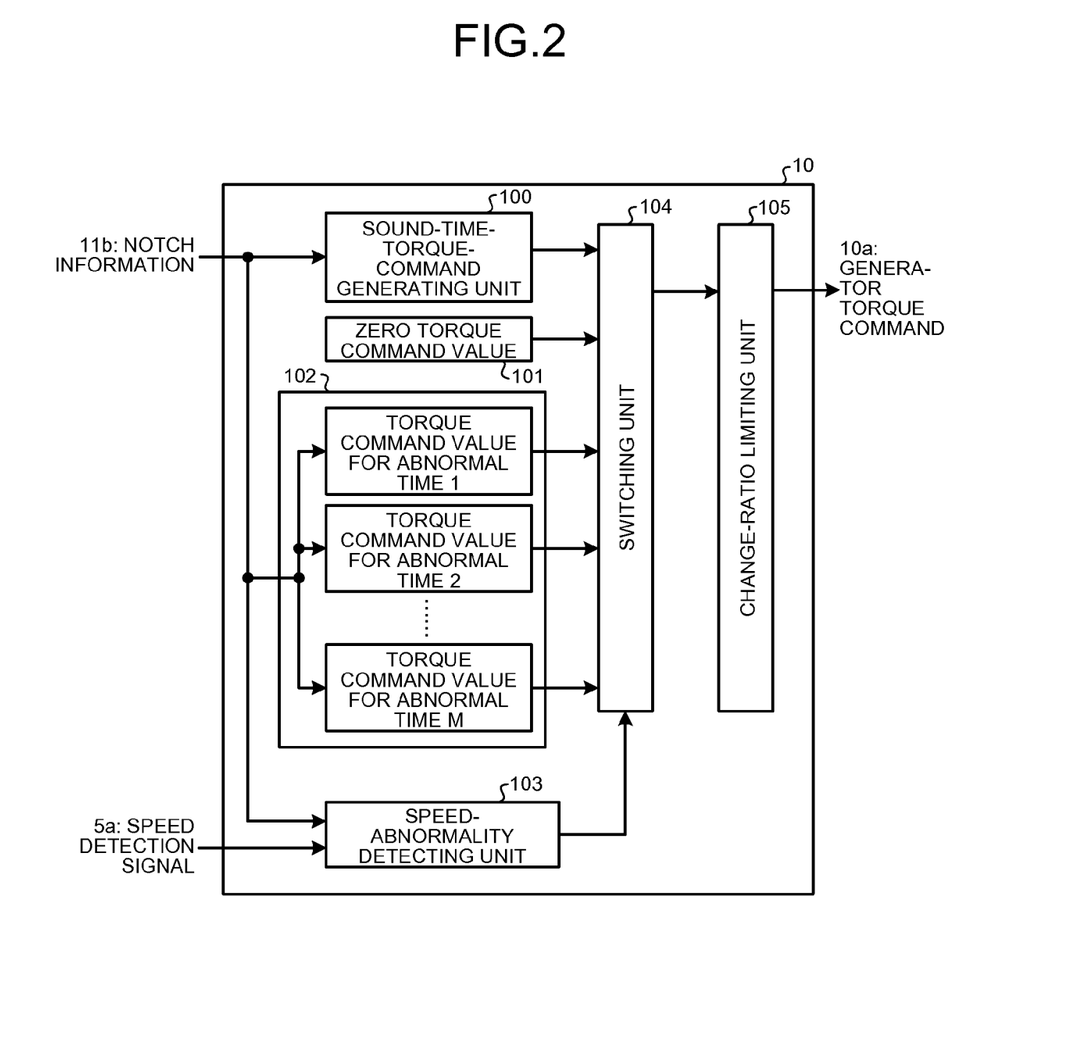
FIG. 2 is a diagram of an example of an internal configuration for attaining the operation of a generator-torque-command generating unit shown in FIG. 1.

On the other hand, the generator-torque-command generating unit 10 receives notch information 11b included in the engine power generation command 11a output to the engine controller 2 by the engine-power-generation-command generating unit 11. The generator-torque-command generating unit 10 selects a torque corresponding to the magnitude of the notch and outputs the selected torque to the converter 4 as a generator torque command 10a. Consequently, operating points of the speed and the torque in the engine 1 and the generator 3 are set according to levels of the engine power generation command, and the engine 1 and the generator 3 continue power generating operations at operating points indicated by circles in FIG. 3. In this way, the host controller 6 controls the speed and the torque of the engine 1 and the generator 3 to thereby obtain desired generated power. The generator-torque-command generating unit 10 can be configured, for example, as shown in FIG. 2. Note that the detailed configuration of the generator-torque-command generating unit 10 is explained below.

A protective cooperation operation between the engine 1 and the generator 3 forming the main part of the present invention is explained with reference to FIGS. 1, 4, and 5.

The generator-torque-command generating unit 10 always monitors a speed detection signal 5a of the speed sensor 5 that detects rotating shaft speed of the engine 1 and the generator 3. Abnormality determination speed K1 is set as a determination threshold for each of command levels, that is, for each of the notches of the engine-power-generation-command generating unit 11.

The engine 1 sometimes cannot generate a mechanical output as commanded by the engine controller 2 because of a disorder or a failure of a part of components. In that case, the engine controller 2 detects the disorder or the failure according to information of sensors set in not-shown various components of the engine 1, reduces fuel injection amount, and shifts to a protection mode. Note that an example of an output torque characteristic obtained when such an output limitation is performed is shown in FIG. 4.

Figure 4:
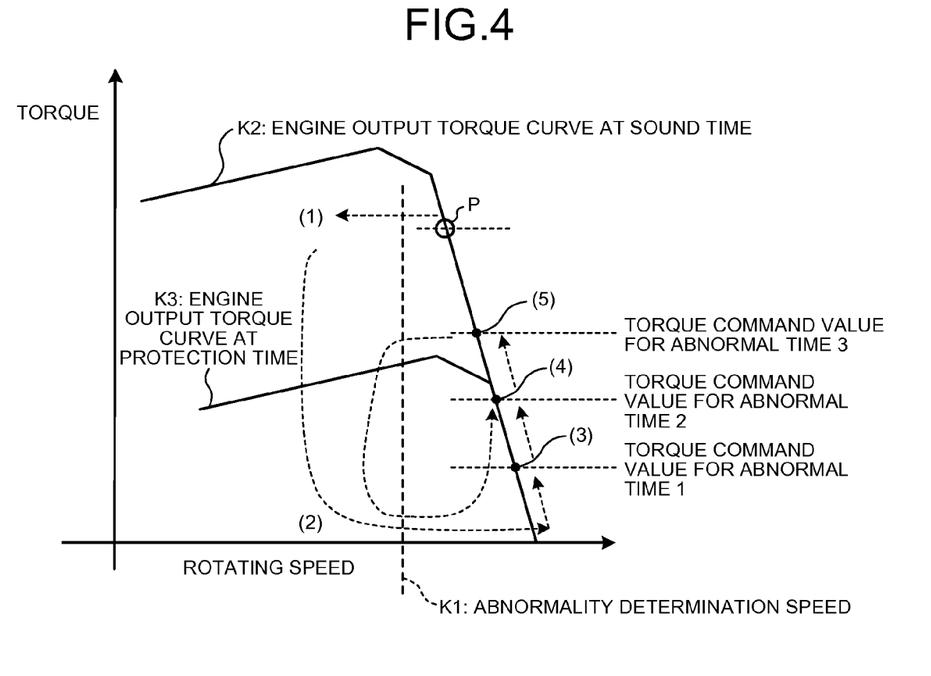
FIG. 4 is a diagram of an example of an operation transition in the vehicle control apparatus according to the first embodiment.

In FIG. 4, an operation state in the engine power generation command 2N shown in FIG. 3 is extracted and shown. When the engine 1 shifts to the protection mode, the output torque of the engine 1 is reduced to decrease. Therefore, the output torque of the generator 3 becomes larger than the output torque of the engine 1. As a result, the output torque of the engine 1 and the output torque of the generator 3 are unbalanced and the difference between the output torque of the generator 3 and the output torque of the engine 1 acts as deceleration torque to the rotating shafts of the engine 1 and the generator 3 and the rotating speed decreases. This state is indicated by (1) in FIG. 4. An operating point P present on an engine output torque curve K2 at the time of a sound operation separates from K2 and shifts in the left direction.

When the rotating speed decreases and falls below the abnormality determination speed (K−1)th generator-torque-command generating unit 10 recognizes an abnormality of the engine 1, provisionally selects a zero torque command value as a generator torque command, and reduces down to 0 [Nm]. This transition is indicated by (2) in FIG. 4. When the generator torque command becomes lower than an engine output torque curve K3 at protection time (a torque output curve for a protection mode of the engine 1), contrary to (1), the difference between the output torque of the generator 3 and the output torque of the engine 1 acts as acceleration torque to the rotating shafts of the engine 1 and the generator 3, and the rotating speed increases and returns to the original rotating speed.

Thereafter, the generator-torque-command generating unit 10 outputs torque command values for abnormal time set in a plurality of stages in advance. In the first embodiment, as shown in FIG. 4, the torque command values for abnormal time set in advance are applied in order from a torque command value for abnormal time 1 having the lowest value among the torque command values for abnormal time. As a result, the operating point P shifts to an operating point (3) in FIG. 4. An application time T of the torque command value for abnormal time 1 in this transition period is set in advance. After the elapse of the time T, if the rotating speed is not lower than the abnormality determination speed, the generator-torque-command generating unit 10 increases the magnitude of the torque command for abnormal time to the next large level. The operating point P shifts to an operating point (4) in FIG. 4. After the time T elapses again, if the rotating speed is not lower than the abnormality determination speed, the generator-torque-command generating unit 10 increases the magnitude of the torque command value for abnormality detection to the next large level. In this way, unless the rotating speed falls below the abnormality determination speed, the torque command value for abnormal time is gradually increased.

When the torque command value at abnormal time at a certain stage exceeds an output torque at the protection mode time on the engine 1 side, the difference between the output torque of the generator 3 and the output torque of the engine 1 acts as the deceleration torque to the rotating shafts of the engine and the generator again and the rotating speed decreases. As a result, the rotating speed falls below the abnormality determination speed K1 again. Therefore, the generator-torque-command generating unit 10 recognizes an abnormality of the engine 1 again. This state is indicated by an operating point (5) in FIG. 4.

When it is assumed that a generator torque command at the operating point (5) in this example is a torque command value for abnormal time in an Nth stage, the generator-torque-command generating unit 10 selects and stores a torque command value for abnormal time in an (N−1)th stage as a limit value of generated generator torque applicable under an engine protection mode state. In an example shown in FIG. 4, N=3.

Thereafter, the generator-torque-command generating unit 10 recognizes an engine abnormality again and reduces the generator torque command to the lowest value of the torque command for abnormal time again to return the rotating speed to the original rotating speed. Thereafter, the generator-torque-command generating unit 10 outputs the torque command value for abnormal time in the (N−1)th stage as the limit value of the generator torque stored as explained above to continue operation. In the example shown in FIG. 4, the operation is continued at the operating point (4).

Referring back to FIG. 2, the detailed configuration of the generator-torque-command generating unit 10 is explained. The generator-torque-command generating unit 10 includes, as shown in FIG. 2, a sound-time-torque-command generating unit 100, a zero-torque-command generating unit 101, a torque-command-for-abnormal-time generating unit 102, a speed-abnormality detecting unit 103, a switching unit 104, and a change-ratio limiting unit 105.

At normal time when the engine is soundly operating, as the generator torque command 10a, a torque command value at sound time output by the sound-time-torque-command generating unit 100 is selected and output by the switching unit 104. On the other hand, in the speed-abnormality detecting unit 103, the before-mentioned abnormality determination speed K1 is set for each of engine notch conditions. While monitoring the notch information 11b of the engine and the speed detection signal 5a, when the speed-abnormality detecting unit 103 determines that the speed detection signal 5a falls below the abnormality determination speed (K−1) the speed-abnormality detecting unit 103 outputs a signal to the switching unit 104. The switching unit 104 selects, on the basis of the signal, a zero torque command value [0 [Nm]] output by the zero-torque-command generating unit 101 and outputs the zero torque command value. Thereafter, the switching unit 104 sequentially selects and outputs abnormal time torque command values 1 to M in a plurality of stages set in the torque-command-for-abnormal-time generating unit 102 in order from the lowest torque command value among the abnormal time torque command values. In a period in which the abnormal time torque command value M was output, when the speed-abnormality detecting unit 103 detects an abnormality again, the speed-abnormality detecting unit 103 selects and stores the abnormal time torque command value in the (M−1)th stage as a limit value of generated generator torque in an engine protection mode, and also outputs a switching signal to the switching unit 104 to finally output the abnormal time torque command value in the (M−1)th stage as the generator torque command 10a. Note that, in the switching of a value of the generator torque command 10a, in order to avoid a stepwise torque change and smoothly apply torque to the generator, the change-ratio limiting unit 105 limits a change ratio with respect to a torque command increase or decrease.

Figure 5:
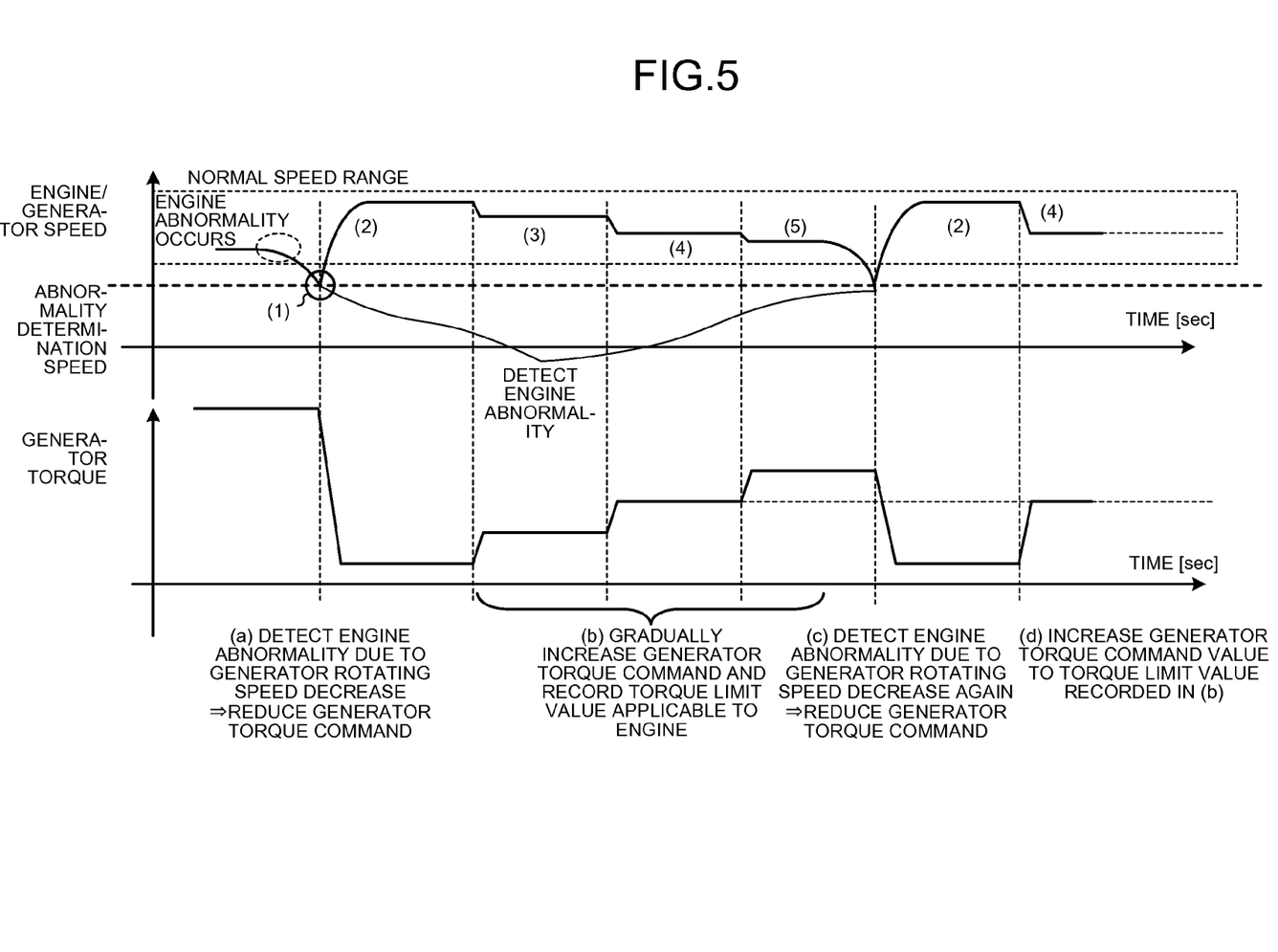
FIG. 5 is a diagram shown as a time chart of the example of the operation transition shown in FIG. 4.

FIG. 5 is a diagram shown as a time chart of the operation transition explained above. The abscissa indicates time and the ordinate indicates engine speed (generator speed), abnormality determination speed, and generator torque. The time chart is explained below with reference to FIG. 1, FIG. 4, and FIG. 5 as appropriate.

[1] First, when some abnormality occurs in the engine 1, an abnormality of the engine 1 due to a rotating speed decrease of the generator 3 is detected. The generator torque command is reduced (step S(a)). At this point, the operating point shifts from (1) to (2) (see FIG. 4).

[2] Subsequently, the generator torque command is sequentially increased. Torque limit values applicable to the engine 1 are sequentially recorded (step (b)). At this point, the operating point shifts to (3), (4), and (5).

[3] When the operating point shifts to (5), the rotating speed of the generator 3 decreases and an abnormality of the engine 1 is detected again. As a result, the generator torque command is reduced again. The operating point shifts to (2) (step (c)).

[4] Among generator torque commands serving as the torque limit values recorded in at step (b), a recorded value immediately before the generator torque command with which a decrease in the rotating speed of the generator 3 was detected when the generator torque command is gradually increased is selected as a torque limit value. This torque limit value is applied as a generator torque command (step (d)). As a result, the operating point shifts to (4).

[5] Note that the generator torque command (in the example shown in FIG. 4, the torque command value for abnormal time 2) applied at step (d) is guaranteed that a decrease in the rotating seed is not detected in the processing at step (b). Therefore, at this operating point, it is possible to cause the engine 1 and the generator 3 to stably operate.

As explained above, with the vehicle control apparatus according to the first embodiment, when the engine 1 and the engine controller 2 have shifted to the protection mode, the generator-torque-command generating unit 10 searches for the magnitude of a torque command applicable in the generator 3. The generator-torque-command generating unit 10 selects and outputs torque equal to or lower than a limit value grasped as a result of the search to continue the operation. According to this control, even when an abnormality or a failure occurs in the engine 1 and an output is reduced, it is possible to search for applicable torque on the generator 3 side to continue the operation with the torque value, so that it is made possible to continue, although limitedly, power supply to an electric motor load for driving the vehicle and move the vehicle to a nearby garage or railway station where maintenance can be performed.

Second Embodiment

In the first embodiment, as the search for a limit torque value applicable by the generator 3 when the output of the engine 1 is reduced because of an abnormality on the engine 1 side, the method of increasing the torque command value for abnormal time stepwise from the smallest value is explained. On the other hand, the toque command value for abnormal time can be reduced stepwise from a largest value. In a second embodiment, this method is explained with reference to FIG. 1, FIG. 6, and FIG. 7. Note that an operation until the engine 1 and the generator 3 shift to the protection mode because of a disorder or the like of a part of the components is the same as the operation in the first embodiment. Explanation of the operation is omitted.

Figure 6:
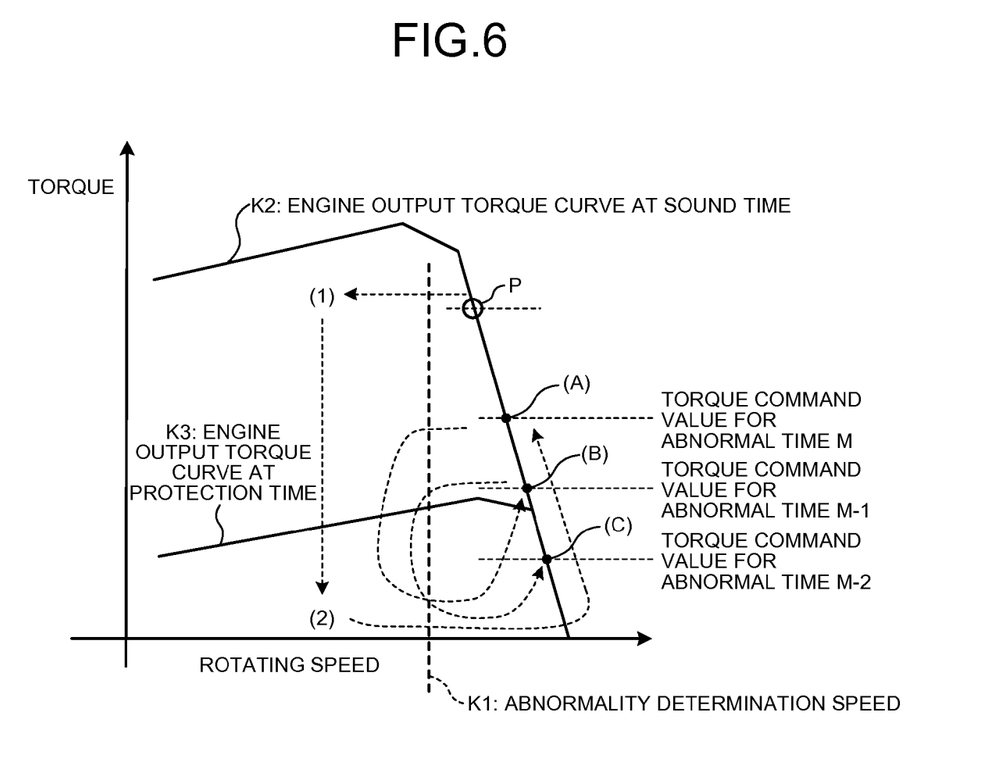
FIG. 6 is a diagram of an example of an operation transition in a vehicle control apparatus according to a second embodiment.

In FIG. 6, an operation state in the engine power generation command 2N shown in FIG. 3 is extracted and shown. When the engine 1 shifts to the protection mode, the output torque of the engine 1 is reduced to decrease. Therefore, a difference between the output torque of the generator 3 and the output torque of the engine 1 acts as deceleration torque to the rotating shafts of the engine 1 and the generator 3 and the rotating speed decreases. This state is indicated by (1) in FIG. 6. As in the first embodiment, the operating point P present on the engine output torque curve K2 at the time of a sound operation separates from K2 and shifts in the left direction.

When the rotating speed decreases and falls below abnormality determination speed, the generator-torque-command generating unit 10 recognizes an abnormality of the engine 1, provisionally reduces a generator torque command to a zero torque command value (0 [Nm]). This transition is indicated by (2) in FIG. 6. When the generator torque command becomes lower than the engine output torque curve K3 at protection time (a torque output curve for a protection mode of the engine 1), contrary to (1), the difference between the output torque of the generator 3 and the output torque of the engine 1 acts as acceleration torque to the rotating shafts of the engine 1 and the generator 3. The rotating speed increases and returns to the original rotating speed. The operation up to the rotating speed return operation is the same as the operation in the first embodiment.

Thereafter, the generator-torque-command generating unit 10 outputs torque command values for abnormal time set in a plurality of stages in advance. In the second embodiment, as shown in FIG. 6, torque command values for abnormal time in M stages set in advance are applied in order from a torque command value for abnormal time M having the highest value among the torque command values for abnormal time. As a result, the operating point P shifts to an operating point (A) in FIG. 6.

At the operating point (A) in this example, the selected torque output in the Mth stage of the torque command value for abnormal time is larger than the engine output torque at the protection mode time. Therefore, the difference between the output torque of the generator 3 and the output torque of the engine 1 acts as deceleration torque to the rotating shafts of the engine 1 and the generator 3 again and the rotating speed decreases. As a result, the rotating speed falls below the abnormality determination speed K1 again. Therefore, the generator-torque-command generating unit 10 recognizes an abnormality of the engine 1 again and reduces the generator torque command to the zero torque command value (0 [Nm]).

Because the abnormality determination is performed again, the generator-torque-command generating unit 10 selects and outputs a torque command value for abnormal time (M−1) having the next highest torque value as the torque command value for abnormal time. As a result, the operating point P shifts to an operating point (B) in FIG. 6.

Thereafter, if the selected torque output in the (M−1)th stage is larger than the output torque of the engine 1, the rotating speed further decreases again and falls below the abnormality determination speed. The generator-torque-command generating unit 10 recognizes an abnormality and reduces the generator torque command to the zero torque command value (0 [Nm]).

Further, thereafter, when a torque command for abnormal time (M−2) is selected and output, in FIG. 6, the operating point P shifts to an operating point (C). At the operating point (C), the selected torque output in the (M−1)th stage is smaller than the output torque of the engine 1. Therefore, the rotating speed stabilizes. If the next abnormality determination of the rotating speed does not occur even if time exceeds a time threshold T set in advance, the generator-torque-command generating unit 10 recognizes that a torque command level currently being output is a limit value of generator torque, continuously outputs the torque command value for abnormal time at the level, and causes the engine 1 and the generator 3 to continue a power generating operation.

In this way, the generator-torque-command generating unit 10 performs the control for selecting the torque command values for abnormal time for the generator 3 stepwise from the highest value until the speed of the generator 3 does not fall below the abnormality determination speed K1. When an output decrease due to an output limitation in the protection mode of the engine 1 is low, there is an effect that it is possible to complete, earlier than in the first embodiment, the search for limit torque that can be output to the generator 3.

Figure 7:
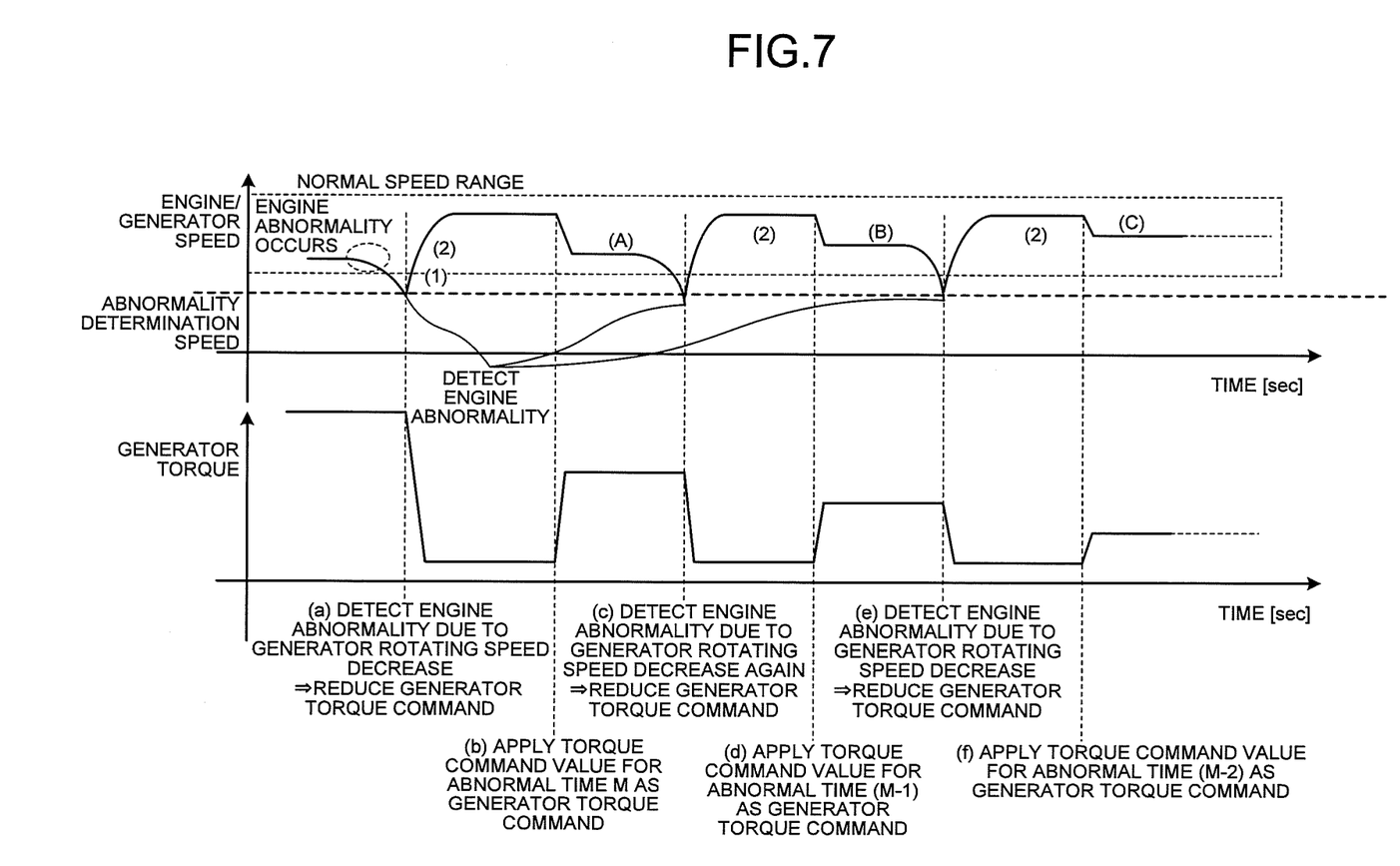
FIG. 7 is a diagram shown as a time chart of the example of the operation transition shown in FIG. 6.

FIG. 7 is a diagram shown as a time chart of the operation transition explained above. The abscissa indicates time and the ordinate indicates engine speed (generator speed), abnormality determination speed, and generator torque. The time chart is explained below with reference to FIG. 1, FIG. 6, and FIG. 7 as appropriate.

[1] First, when some abnormality occurs in the engine 1, an abnormality of the engine 1 due to a decrease in the rotating speed of the generator 3 is detected. The generator torque command is reduced (step (a)). At this point, the operating point shifts from (1) to (2) (see FIG. 6).

[2] Subsequently, the torque command value for abnormal time M is applied as the generator torque command. The operating point shifts to (A) (step (b)).

[3] When the operating point shifts to (A), the rotating speed of the generator 3 decreases and an abnormality of the engine 1 is detected again. As a result, the generator torque command is reduced again. The operating point shifts to (2) (step (c)).

[4] Subsequently, as the generator torque command, the torque command value for abnormal time (M−1) having a highest torque value next to the torque command value for abnormal time M selected at step (b) is applied. The operating point shifts to (B) (step (d)).

[5] Like the operating point (A), the operating point (B) is an operating point where a decrease in the rotating speed of the generator 3 is detected. Therefore, a reduction in the generator torque command is executed again. The operating point shifts to (2) (step (e)).

[6] Subsequently, as the generator torque command, the torque command value for abnormal time (M−2) having a highest torque value next to the torque command value for abnormal time (M−1) selected at step (d) is applied. The operating point shifts to (C) (step (f)).

[7] Thereafter, as explained with reference to FIG. 6, the time when abnormality determination of the rotating speed does not occur is measured. If a measured value of the time exceeds the time threshold T set in advance, the torque command currently being output (the torque command value for abnormal time (M−2)) is continuously output. The engine 1 and the generator 3 are caused to continue the power generating operation.

As explained above, with the vehicle control apparatus according to the second embodiment, when the engine 1 and the engine controller 2 shift to the protection mode, the generator-torque-command generating unit 10 performs the control for selecting the torque command values for abnormal time for the generator 3 stepwise from the highest value until the speed of the generator 3 does not fall below the abnormality determination speed (K−1) therefore, even when an abnormality or a failure has occurred in the engine 1, it is possible to search for applicable torque on the generator 3 side to continue operation with the torque value. It is possible to continue, although limitedly, power supply to an electric motor load for driving the vehicle and move the vehicle to a nearby garage or railway station where maintenance can be performed.

INDUSTRIAL APPLICABILITY

As explained above, the present invention is useful as a vehicle control apparatus that can perform protective operation cooperation in which a plurality of protection levels are set.

REFERENCE SIGNS LIST

1 Engine
2 Engine controller
2a Fuel injection amount command
3 Generator
4 Converter
5 Speed sensor
5a Detection signal
6 Host controller
7 Load apparatus
10 Generator-torque-command generating unit
10a Generator torque command
11 Engine-power-generation-command generating unit
11a Engine power generation command
11b Notch information
100 Sound-time-torque-command generating unit
101 Zero-torque-command generating unit
102 Torque-command-for-abnormal-time generating unit
103 Speed-abnormality detecting unit
104 Switching unit
105 Change-ratio limiting unit

The invention claimed is:

1. A vehicle control apparatus applied to a vehicle driving system including an engine, an engine controller that controls operation of the engine, a generator coupled to the engine, a converter that converts alternating-current power output by the generator into desired direct-current power, a load apparatus that receives supply of the direct-current power from the converter and operates, and a rotating-speed detector that detects rotating speed of the generator, the vehicle control apparatus being configured to control operations of the engine controller and the converter, wherein a host controller that controls the engine controller and the converter is provided, the host controller includes:

an engine-power-generation-command generating unit that generates an engine power generation command for causing the engine to operate and drive the generator, and that outputs the engine power generation command to the engine controller; and a generator-torque-command generating unit that receives notch information, indicating one of a plurality of stages, included in the engine power generation command, selects a torque corresponding to the indicated stage, and outputs the selected torque to the converter as a generator torque command, wherein the generator-torque-command generating unit:

monitors an abnormal operation of the engine, switches, when the abnormal operation of the engine is detected, the generator torque command to the lowest value of a torque command value for abnormal time set in advance as the generator torque command, thereafter, gradually increases the generator torque command, records, as a torque limit value, a magnitude of the generator torque command at the time when the abnormal operation of the engine is detected again, and switches the generator torque command to a torque command value for abnormal time having a value smaller than the recorded torque limit value.

* * * * *